United States Patent
Ka et al.

(10) Patent No.: US 12,281,426 B2
(45) Date of Patent: Apr. 22, 2025

(54) WASHING MACHINE AND CONTROLLING METHOD THEREOF

(71) Applicant: Samsung Electronics Co., Ltd., Suwon-si (KR)

(72) Inventors: Keehwan Ka, Suwon-si (KR); Seongjoo Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 869 days.

(21) Appl. No.: 16/953,913

(22) Filed: Nov. 20, 2020

(65) Prior Publication Data

US 2021/0164142 A1 Jun. 3, 2021

(30) Foreign Application Priority Data

Nov. 29, 2019 (KR) .......................... 10-2019-0157548

(51) Int. Cl.
*D06F 33/40* (2020.01)
*D06F 23/04* (2006.01)
(Continued)

(52) U.S. Cl.
CPC .............. *D06F 33/40* (2020.02); *D06F 23/04* (2013.01); *D06F 33/47* (2020.02); *D06F 34/22* (2020.02);
(Continued)

(58) Field of Classification Search
CPC .......... D06F 33/40; D06F 33/47; D06F 33/48; D06F 33/60; D06F 33/74; D06F 33/76; D06F 34/16; D06F 34/18; D06F 34/22; D06F 35/007; D06F 2103/02; D06F 2103/04; D06F 2103/18; D06F 2103/26; D06F 2105/48; D06F 2105/52; D06F 2105/54; D06F 2105/62; D06F 21/06;
(Continued)

(56) References Cited

U.S. PATENT DOCUMENTS

| 2008/0178398 A1* | 7/2008 | Darby ................... D06F 37/145 68/12.02 |
| 2013/0160217 A1* | 6/2013 | Tietz ..................... D06F 37/263 8/137 |

(Continued)

FOREIGN PATENT DOCUMENTS

| CN | 109183354 A | 1/2019 |
| JP | H10174798 A * | 6/1998 |

(Continued)

OTHER PUBLICATIONS

Machine Translation of Nakamura et al., JP 2002-136793, May 2002. (Year: 2002).*

(Continued)

*Primary Examiner* — David G Cormier
(74) *Attorney, Agent, or Firm* — Jefferson IP Law, LLP

(57) ABSTRACT

A washing machine and a method for controlling the washing machine are provided. The washing machine includes a washing tub configured to accommodate a laundry, a camera configured to be disposed in a direction towards an inside of the washing tub, and a processor configured to confirm whether water collection of the laundry exists by using an image captured by the camera during rotation of the washing tub.

7 Claims, 15 Drawing Sheets

(51) Int. Cl.
  *D06F 33/47* (2020.01)
  *D06F 34/22* (2020.01)
  *G06T 7/00* (2017.01)
  *G06T 7/60* (2017.01)
  *D06F 103/18* (2020.01)
  *D06F 105/48* (2020.01)
  *D06F 105/62* (2020.01)

(52) U.S. Cl.
  CPC .............. *G06T 7/0004* (2013.01); *G06T 7/60* (2013.01); *D06F 2103/18* (2020.02); *D06F 2105/48* (2020.02); *D06F 2105/62* (2020.02); *G06T 2207/30164* (2013.01)

(58) Field of Classification Search
  CPC .......... D06F 21/08; D06F 23/04; D06F 37/02; D06F 37/12
  See application file for complete search history.

(56) References Cited

U.S. PATENT DOCUMENTS

| | | |
|---|---|---|
| 2018/0080164 A1 | 3/2018 | Hoppe et al. |
| 2020/0063315 A1 | 2/2020 | Yoon |
| 2020/0378051 A1* | 12/2020 | Davis ...................... D06F 37/32 |

FOREIGN PATENT DOCUMENTS

| | | |
|---|---|---|
| JP | 2002-136793 A | 5/2002 |
| JP | 2018-068539 A | 5/2018 |
| JP | 2019-187977 A | 10/2019 |
| KR | 10-2013-0044764 A | 5/2013 |
| KR | 10-2015-0052696 A | 5/2015 |
| KR | 10-2016-0084698 A | 7/2016 |
| KR | 10-2017-0090162 A | 8/2017 |
| KR | 10-2019-0026517 A | 3/2019 |
| KR | 10-2019-0103083 A | 9/2019 |

OTHER PUBLICATIONS

Machine Translation of Matsumoto, JP H10174798, Jun. 1998. (Year: 1998).*

International Search Report dated Mar. 22, 2021, issued in International Patent Application No. PCT/KR2020/016529.

Korean Office Action dated Jan. 24, 2025, issued in a Korean Patent Application No. 10-2019-0157548.

* cited by examiner

WASHING MACHINE AND CONTROLLING METHOD THEREOF

CROSS-REFERENCE TO RELATED APPLICATION(S)

This application is based on and claims priority under 35 U.S.C. § 119(a) of a Korean patent application number 10-2019-0157548, filed on Nov. 29, 2019, in the Korean Intellectual Property Office, the disclosure of which is incorporated by reference herein in its entirety.

BACKGROUND

1. Field

The disclosure relates to a washing machine and a controlling method thereof More particularly, the disclosure relates to a washing machine which detects a water collection phenomenon and a controlling method thereof.

2. Description of Related Art

In general, a washing machine may refer to a machine device which removes dirt from laundry using water and a detergent. The washing machine may be broadly divided into a drum washing machine and an automatic washing machine.

In general, the automatic washing machine may include a tub for storing wash water, a washing tub rotatably installed in the tub, a pulsator rotatably installed on a bottom of the inside of the washing tub, and a driving device for rotating the washing rub and the pulsator.

When the pulsator rotates forward and reversely while laundry and wash water are loaded in the washing tub, the pulsator may agitate the laundry with the wash water to remove dirt from the laundry.

However, such a washing machine washes the laundry with a rotation water flow occurring due to the forward and reverse rotation of the pulsator, and accordingly, the twisting of the laundry may occur. According to the materials and types of the twisted laundry, the wash water may not be discharged and a large amount of the wash water may exist between the laundries.

If the dehydration with rapid-speed rotation proceeds in such a situation, a pressure of the large amount of wash water existing between the laundries may increase. The wash water at a high pressure may cause breakdown of the washing machine or a user may receive a physical damage due to the wash water at a high pressure.

The above information is presented as background information only to assist with an understanding of the disclosure. No determination has been made, and no assertion is made, as to whether any of the above might be applicable as prior art with regard to the disclosure.

SUMMARY

Aspect of the disclosure are to address at least the above-mentioned problems and/or disadvantages and to provide at least the advantages described below. Accordingly, an aspect of the disclosure is to provide a washing machine which detects a water collection phenomenon and prevents an accident due to that and a controlling method thereof.

Additional aspects will be set forth in part in the description which follows and, in part, will be apparent from the description, or may be learned by practice of the presented embodiments.

In accordance with an aspect of the disclosure, a washing machine is provided. The washing machine includes a washing tub configured to accommodate a laundry, a camera configured to be disposed in a direction towards an inside of the washing tub, and a processor configured to confirm whether water collection of the laundry exists by using an image captured by the camera during rotation of the washing tub.

In accordance with another aspect of the disclosure, a method for controlling a washing machine is provided. The method includes capturing an inside of a washing tub during rotation of the washing tub accommodating a laundry, and confirming whether water collection of the laundry exists by using the captured image.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
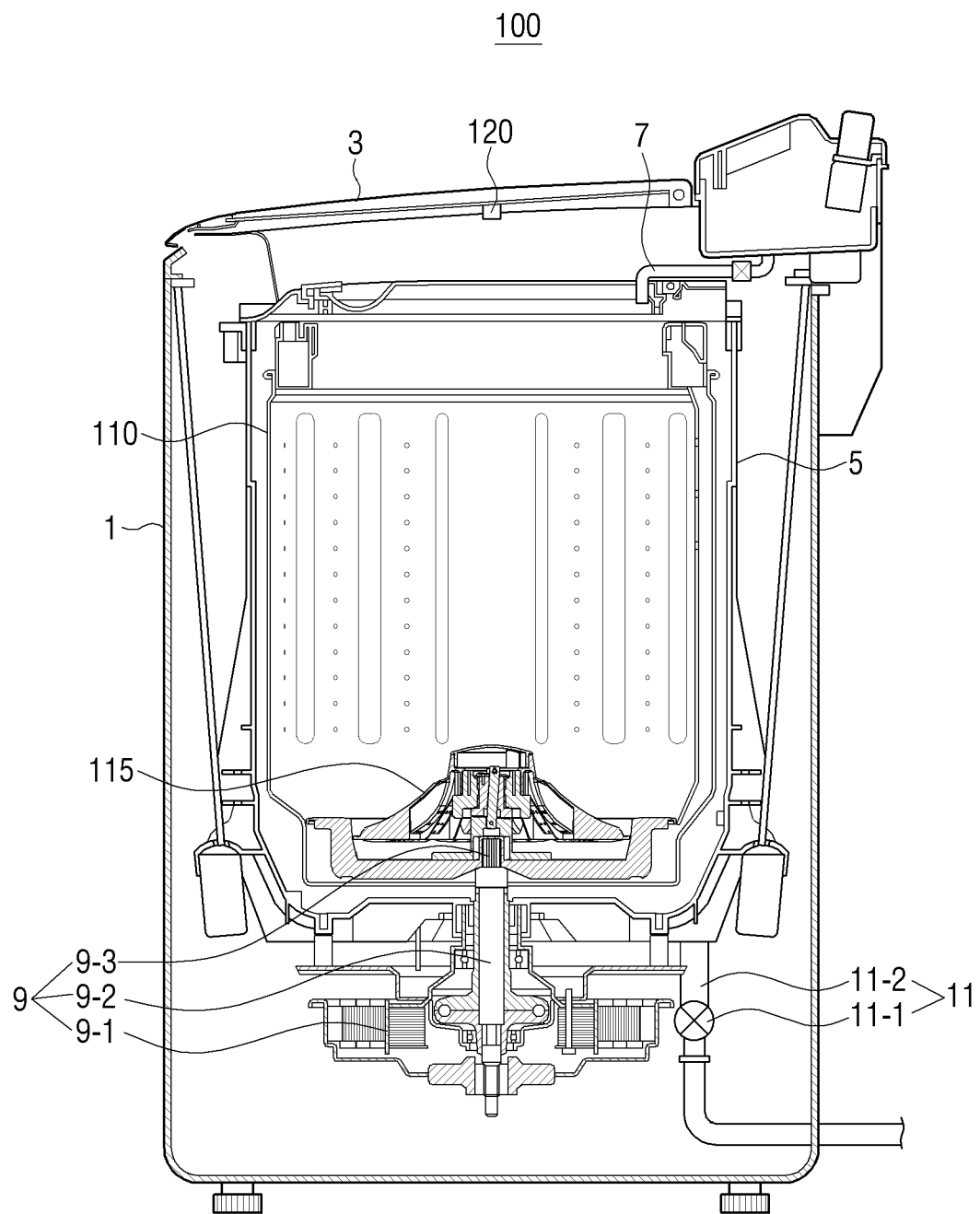
FIG. 1 is a cross-sectional view of a washing machine according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The same reference numerals or symbols in the accompanying drawings in this specification denote parts or components executing substantially the same function. For convenience of description and understanding, the description will be made using the same reference numerals or symbols in different embodiments. For example, although the components with the same reference numerals are illustrated in the plurality of drawings, the plurality of drawings are not illustrating one embodiment.

In addition, terms including ordinals, such as "first" or "second" may be used for distinguishing components in the specification and claims. Such ordinals are used for distinguishing the same or similar components and the terms should not be limitedly interpreted due to the use of ordinals. For example, in regard to components with such ordinals, usage order or arrangement order should not be limitedly interpreted with the numbers thereof The ordinals may be interchanged, if necessary.

Unless otherwise defined specifically, a singular expression may encompass a plural expression. It is to be understood that the terms, such as "comprise" or "consist of" are used herein to designate a presence of characteristic, number, operation, element, part, or a combination thereof, and not to preclude a presence or a possibility of adding one or more of other characteristics, numbers, operations, elements, parts or a combination thereof.

The embodiments may be variously changed and include various embodiments of the disclosure, and specific embodiments will be shown in the drawings and described in the description. However, it should be understood that this is not to limit the scope of the specific embodiments and all modifications, equivalents, and/or alternatives included in the disclosed spirit and technical scope are included. In describing the disclosure, a detailed description of the related art may be omitted when it is determined that the detailed description may unnecessarily obscure a gist of the disclosure.

The terms "first," "second," or the like may be used for describing various elements but the elements may not be limited by the terms. The terms are used only to distinguish one element from another.

In this disclosure, expressions, such as "A or B", "at least one of A [and/or] B,", or "one or more of A [and/or] B," include all possible combinations of the listed items. For example, "A or B", "at least one of A and/or B,", or "at least one or more of A and/or B" may be interpreted to include any of (1) A, (2) B, or (3) A and B, unless otherwise noted, and other elements may also be further included in this case.

In addition, the expression "configured to" used in the disclosure may be interchangeably used with other expressions, such as "suitable for," "having the capacity to," "designed to," "adapted to," "made to," and "capable of," depending on cases. The expression "configured to (or set to)" does not necessarily refer to a device being "specifically designed to" in terms of hardware. Instead, under some circumstances, the expression "a device configured to" may refer to the device being "capable of" performing an operation together with another device or component. For example, the phrase "a processor configured (or set) to perform A, B, and C" may refer, for example, and without limitation, to a dedicated processor (e.g., an embedded processor) for performing the corresponding operations, a generic-purpose processor (e.g., a central processing unit (CPU) or an application processor), or the like, that can perform the operations by executing one or more software programs stored in a memory device.

In the specification, a "washing machine" may refer to an electronic device which automatically washes laundry and removes dirt attached to the laundry by a method for loading wash water obtained by mixing a detergent and water into a main body, agitating the wash water with the laundry, and the like.

The examples described below are exemplified for understanding of the disclosure and it should be understood that the disclosure may be modified and performed variously unlike in the examples described herein. However, in describing the disclosure, a detailed description of the related art or elements may be omitted when it is determined that the detailed description thereof may unnecessarily obscure a gist of the disclosure. In addition, the accompanying drawings may not be illustrated with actual scales but may be illustrated with enlarged dimensions of some elements, for the understanding of the disclosure.

FIG. 1 is a cross-sectional view of a washing machine according to an embodiment of the disclosure.

Referring to FIG. 1, a washing machine 100 according to an embodiment of the disclosure may include a main body 1, a door 3, a tub 5, a water supply pipe 7, a driving unit 9, a washing tub 110, a pulsator 115, a camera 120, and a processor 130.

The main body 1 may be formed in an approximately rectangular shape to form an appearance of the washing machine 100, and a laundry opening for loading a laundry to the washing tub 110 may be provided at an upper end of the main body 1.

The door 3 for opening and closing the laundry opening may be provided on an upper surface of the main body 1. The door 3 may be formed to open and close the laundry opening of the washing machine 100 and provided on the upper surface of the main body 1. The door 3 may prevent wash water or a laundry from being discharged to outside of the washing machine 100 during the operation of the washing machine 100. Herein, the wash water may refer to normal water and the wash water may also refer to a mixture further including a detergent, pollutants, and the like in addition to water.

In addition, the door 3 may be formed of a transparent material and implemented so that the inside of the washing tub 110 is seen during the operation of the washing machine 100. In addition, the camera 120 may be provided in one area of the door 3. If the door 3 is formed of a transparent material, the camera 120 may be implemented to be mounted in the door 3 or, if the door 3 is formed of a non-transparent material, the camera 120 may be disposed at a lower end of the door 3.

The tub 5 may be installed vertically in the main body 1 and formed in a hollow cylindrical shape including a bottom to accommodate a certain amount of wash water. The tub 5 may be supported by the main body 1 with a suspension device so that vibration occurring from the tub 5 during the washing may be reduced.

The water supply pipe 7 for supplying the wash water to the tub 5 may be provided on the tub 5. One end of the water supply pipe 7 may be connected to a detergent supply device. A water supply pipe (not illustrated) for supplying external water may be provided in the detergent supply device. Accordingly, the water supplied via the water supply pipe may be supplied into the tub 5 via the water supply pipe 7 with a detergent by passing through the detergent supply device.

A drainage device 11 for discharging the wash water accommodated in the tub 5 to outside of the main body 1 may be provided below the tub 5. The drainage device 11 may include a drain pipe 11-2 connected to a lower portion of the tub 5 and a drain valve 11-1 installed on the drain pipe 11-2. The drain pipe 11-2 may be provided with a drain pump (not illustrated) for discharging the wash water forcibly from the tub 5.

The washing tub 110 may be formed in a hollow cylindrical shape having a bottom surface and installed rotatably in the tub 5. A plurality of through holes are provided on a circumferential surface of the washing tub 110 so that the wash water filled in the tub 5 may be supplied to or discharged from the washing tub 110. A balancer may be provided on the upper end of the washing tub 110 so that the washing tub 110 stably rotates during high-speed rotation of the washing tub 110.

The washing tub 110 may accommodate the laundry loaded through the laundry opening. The laundry accommodated in the washing tub 110 may be washed by a water flow generated due to the rotation of the pulsator 115 provided on the bottom surface of the washing tub 110 and the washing tub 110.

A predetermined pattern may be formed on the bottom surface of the washing tub 110. Herein, the predetermined pattern may include at least one of a lattice pattern, a streak pattern, or a fan pattern. In addition, the predetermined pattern may be disposed in a center area of the pulsator 115.

The pulsator 115 may be installed on the bottom surface in the washing tub 110 to be rotatable independently from the washing tub 110 and may agitate the laundry loaded into the washing tub 110 with the wash water. Specifically, the pulsator 115 may be formed in a disc shape and may generate a rotation water flow by rotating the pulsator 115.

A predetermined pattern may be disposed in the center area of the pulsator 115. The predetermined pattern may be described later with reference to FIGS. 3 and 4.

The driving unit 9 may be installed below the tub 5 and may generate a rotational power for rotating the pulsator 115 and the washing tub 110. Specifically, the driving unit 9 may include a motor 9-1, a dehydration shaft 9-2, and a washing shaft 9-3.

The dehydration shaft 9-2 may be connected to the washing tub 110 to rotate the washing tub 110, and the washing shaft 9-3 may be connected to the pulsator 115 to rotate the pulsator 115. Specifically, the rotational power of the motor 9-1 may be transmitted directly to the washing shaft 9-3. The motor 9-1 may include a stator (not illustrated) and a rotor (not illustrated). The stator may be fixed to a lower surface of the tub 5 and the rotor may be connected to the washing shaft 9-3.

The driving unit 9 may perform control so that the washing tub 110 rotates together with the pulsator 115 or the pulsator 115 rotates while the washing tub 110 is stationary, by using the dehydration shaft 9-2 and the washing shaft 9-3. For example, when the driving unit 9 transfers the rotational power of the motor 9-1 to the dehydration shaft 9-2, the washing tub 110 may rotate, and when the driving unit 9 does not transfer the rotational power of the motor 9-1 to the dehydration shaft 9-2, the washing tub 110 may not rotate.

The camera 120 may be disposed in a direction towards the inside of the washing tub 110. Specifically, the camera 120 may be disposed to capture a center area of the bottom surface of the washing tub 110. For example, the camera 120 may be mounted and disposed in one area of the door 3 or disposed in one area adjacent to the water supply pipe 7 to capture the center area of the bottom surface of the washing tub.

Hereinabove, the mechanical features of the washing machine 100 according to an embodiment of the disclosure have been described with reference to FIG. 1. Meanwhile, FIG. 1 illustrates that the washing machine 100 is a pulsator type for generating a water flow by rotating the pulsator around a horizontal shaft or a vertical shaft, but this is merely an embodiment of the disclosure, and various types of washing machine may be implemented. Hereinafter, for convenience of description, the description will be made by assuming that the washing machine 100 of the disclosure is a pulsator type.

In addition, the washing machine 100 according to various embodiments of the disclosure may be implemented in combination with other electronic devices. For example, the washing machine 100 may include at least one of a dryer, a personal computer (PC), a television (TV), a digital video disk (DVD) player, an audio system, a refrigerator, air-conditioner, an oven, an air purifier, a set top box, a home automation control panel, a security control panel, a media box (e.g., SAMSUNG HOMESYNC™, APPLE TV™, or GOOGLE TV™), a game console, a digital frame security device, industrial or domestic robots, or Internet of Things.

Figure 2:
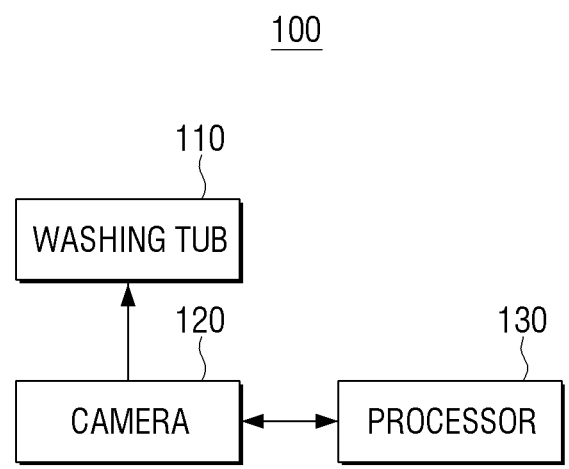
FIG. 2 is a block diagram illustrating a brief configuration of a washing machine according to an embodiment of the disclosure.

FIG. 2 is a block diagram illustrating a brief configuration of a washing machine according to an embodiment of the disclosure.

Referring to FIG. 2, the washing machine 100 may include the washing tub 110, the camera 120, and the processor 130. However, there is no limitation to the above configuration and some elements may be added or omitted according to the type of the washing machine 100.

Referring to FIG. 1, the washing tub 110 may be an element for accommodating a laundry and wash water. The washing tub 110 has been described above with reference to FIG. 1, and therefore the overlapped description will not be repeated.

The camera 120 may capture the inside of the washing tub 110. The camera 120 may be disposed in a direction towards the inside of the washing tub 110 to capture the inside of the washing tub 110. Specifically, the camera 120 may be disposed in at least one of one area of the door 3 or one area adjacent to the water supply pipe 7. FIG. 1 illustrates that the camera 120 is mounted on one area of the door 3, but the washing machine 100 may include a plurality of cameras 120 and the cameras 120 may be implemented to be disposed at both of one area of the door 3 and one area adjacent to the water supply pipe 7.

In addition, the camera 120 may generate an image by capturing the inside of the washing tub 110. The image captured by the camera 120 may include a plurality of red green, and blue (RGB) images. Herein, the RGB image may be an image expressed in a flat structure which may be referred to as a 2 dimensional (2D) image or 2D data, and may be a normal image including a color, a brightness, a chroma, and the like. The image captured by the camera 120 may include the RGB image, and accordingly, the processor 130 may detect an object corresponding to the predetermined pattern based on the captured image.

The processor 130 may be electrically connected to each element of the washing machine 100 and control general operations and functions of the washing machine 100. For example, the processor 130 may operate an operating system or an application program to control hardware or software elements connected to the processor 130 and perform various data processing and operations. In addition, the processor 130 may load and process an instruction or data received from at least one of other elements on a volatile memory and store various pieces of data in a non-volatile memory. For this, the processor 130 may be implemented as a dedicated processor (e.g., an embedded processor) for performing the corresponding operations or a generic-purpose processor (e.g., a CPU or an application processor) capable of performing the corresponding operations by executing one or more software programs stored in a memory device.

The processor 130 may confirm whether water collection of the laundry has occurred by using the image captured by the camera 120. Specifically, the camera 120 may generate an image obtained by capturing the predetermined pattern on the bottom surface of the washing tub 110 during the rotation of the washing tub 110 or the rotation of the pulsator 115. In addition, the processor 130 may confirm whether water collection has occurred based on whether the object corresponding to the predetermined pattern is detected in the image captured by the camera 120. Herein, the processor 130 may confirm whether the water collection has occurred by using an image captured by the camera during a dehydration process of the laundry.

The processor 130 may confirm that no water collection has occurred, when the object corresponding to the predetermined pattern is detected, and may confirm that the water collection has occurred, when the object corresponding to the predetermined pattern is not detected. For example, when the water collection has occurred in the washing tub 110, the laundry and the wash water may be disposed at the center of the washing tub 110 and the object corresponding to the predetermined pattern may be captured in an overlapped manner with the laundry and the wash water disposed at the center. Accordingly, the processor 130 may determine whether the water collection has occurred.

In addition, when the water collection is confirmed, the processor 130 may control a rotation speed so that the washing tub 110 or the pulsator 115 rotate at a speed equal to or lower than a predetermined speed. When the water collection has occurred, a pressure of the wash water in the formed water collection may increase due to high-speed rotation. Accordingly, when the water collection has occurred, the processor 130 may control the rotation speed of the washing tub 110 or the pulsator 115 to be equal to or lower than the predetermined speed, in order to prevent breakdown of the washing machine 100 and physical damage.

In addition, the processor 130 may confirm a rotation shaft of the washing tub 110 using the image captured by the camera 120 and confirm an abnormal situation of the washing machine 100, if the confirmed rotation shaft is beyond a predetermined range. For example, during a normal driving of the washing machine 100, the rotation shaft of the washing tub 110 may move within a predetermined range of −5 degrees or 5 degrees. Meanwhile, when an abnormal situation, such as the water collection in the washing machine 100 or insertion of foreign materials to one surface including a lower surface of the washing tub 110 occurs, the rotation shaft of the washing tub 110 may move beyond the predetermined range. In this case, the processor 130 may identify the abnormal situation of the washing machine 100.

Figure 3:
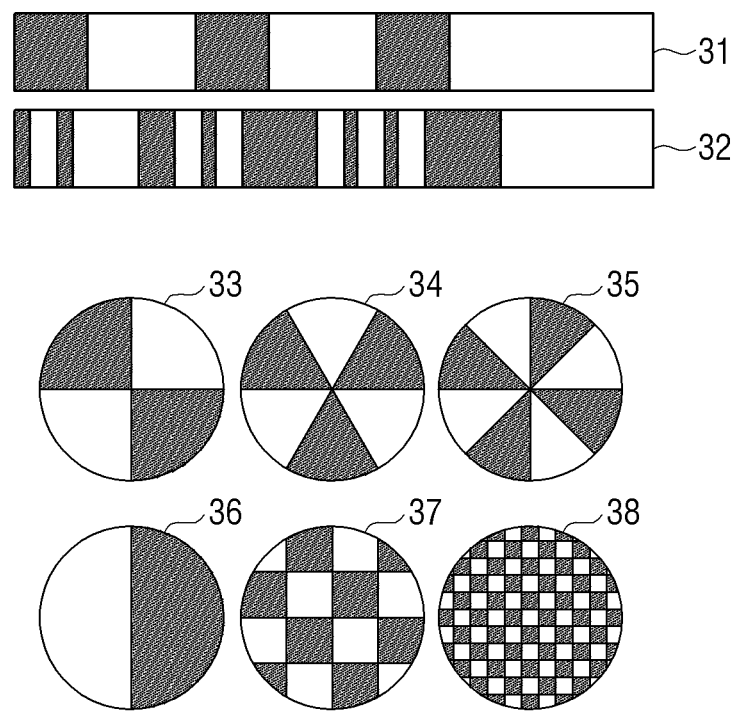
FIG. 3 is a diagram illustrating predetermined patterns according to an embodiment of the disclosure.

FIG. 3 is a diagram illustrating predetermined patterns according to an embodiment of the disclosure.

Referring to FIG. 3, it illustrates first to eighth patterns 31 to 38 and at least one of the first to eighth patterns 31 to 38 may be formed on the bottom surface of the washing tub 110.

According to another embodiment of the disclosure, the pulsator 115 may be formed on the bottom surface of the washing tub 110 and at least one of the first to eighth patterns 31 to 38 may be disposed in the center area of the pulsator 115.

Referring to FIG. 3, the predetermined pattern may be formed to include at least one of a lattice pattern, a streak pattern, or a fan pattern. Specifically, the lattice pattern may be the seventh pattern 37 or the eighth pattern 38, the streak pattern may be the first pattern 31 or the second pattern 32, and the fan pattern may be the third pattern 33, the fourth pattern 34, the fifth pattern 35, or the sixth pattern 36.

The first to eighth patterns 31 to 38 may be formed on the button surface of the washing tub 110 or on the pulsator 115. Specifically, the first to eighth patterns 31 to 38 may be implemented using a step of plating, plastics, coating, applying a light emitting material, or applying a metal material to the bottom surface of the washing tub 110 or the pulsator 115. In addition, the first to eighth patterns 31 to 38 may be implemented using a difference in color or a difference in material.

Meanwhile, the predetermined patterns 31 to 38 illustrated in FIG. 3 are illustrated as examples for convenience of description and are not limited to the shape illustrated in FIG. 3. In addition, the predetermined pattern may be a pattern formed on the bottom surface of the washing tub 110 or on the pulsator 115 which is hardly observed from the normal laundry and may be an arbitrary shape identified by the washing machine 100 in a stationary state. In addition, the predetermined pattern may be a shape for increasing a recognition accuracy of the washing machine 100 and may be implemented with embossed or engraved bottom surface of the washing tub 110 or pulsator 115.

Figure 4:
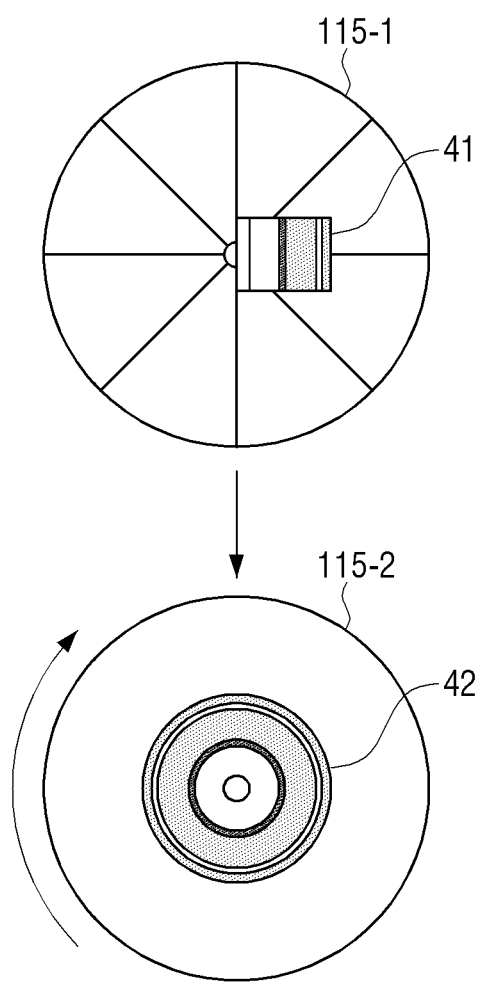
FIG. 4 is a diagram illustrating a change in shape of a predetermined pattern when operating the washing machine according to an embodiment of the disclosure.
Figure 5:
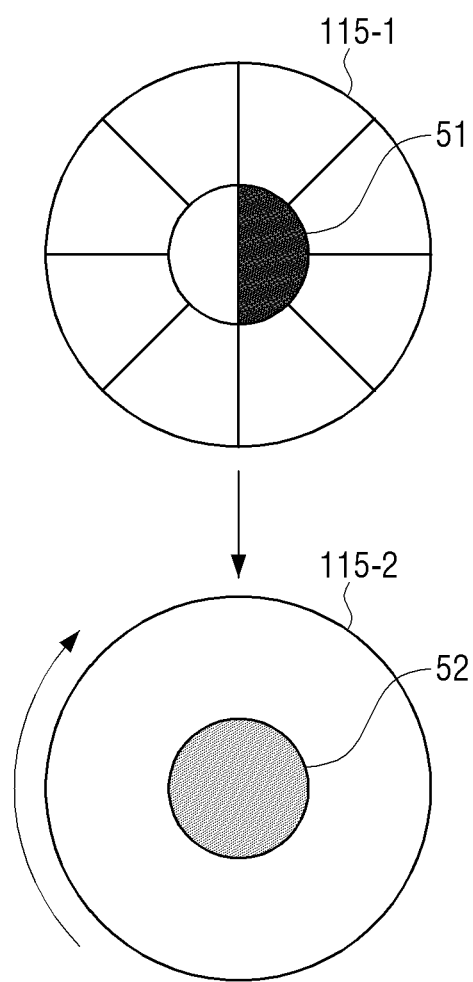
FIG. 5 is a diagram illustrating a change in shape of a predetermined pattern when operating a washing machine according to an embodiment of the disclosure.

FIGS. 4 and 5 are diagrams illustrating a change in shape of a predetermined pattern when operating a washing machine according to various embodiments of the disclosure.

Referring to FIGS. 4 and 5, they illustrate a stationary pulsator 115-1 and an operating pulsator 115-2. FIGS. 4 and 5 illustrate the pulsator 115 for convenience of description, but in the implementation, the predetermined pattern may be formed on the bottom surface of the washing tub 110, without including the pulsator 115.

Referring to FIG. 4, the predetermined pattern may be formed on the stationary pulsator 115-1. Specifically, the predetermined pattern may be a streak pattern 41 and the streak pattern 41 may be disposed in the center area of the stationary pulsator 115-1.

The washing machine 100 may rotate the pulsator 115 according to a predetermine mode (e.g., a dehydration process). A specific shape corresponding to the predetermined pattern may be generated on the operating pulsator 115-2. Herein, the specific shape may be a shape formed by the predetermined pattern by the rotation of the pulsator 115.

In addition, the washing machine 100 may capture the operating pulsator 115-2 and confirm whether the water collection has occurred based on whether an object 42 is detected from the captured image. Herein, the shape of the object 42 to be formed may vary depending on the predetermined pattern (e.g., a streak pattern 41), a vibration intensity, and a rotation speed. Specifically, shadow, chroma, or color of the object 42 included in the captured image may vary depending on the shape of the predetermined pattern. In addition, in a case where the pulsator 115 rotates at a high speed, a circular band formed by the streak pattern 41 may be clearly formed. Alternatively, if the vibration intensity is high during the operation of the washing machine 100, the circular band formed by the streak pattern 41 may be formed to be close to an ellipse or distorted.

FIG. 5 is a diagram illustrating a change in shape of the predetermined pattern when operating the washing machine according to an embodiment of the disclosure.

Referring to FIG. 5, a predetermined pattern may be formed on the stationary pulsator 115-1. Specifically, the predetermined pattern may be a fan-shaped pattern 51 and the fan-shaped pattern 51 may be disposed in the center area of the stationary pulsator 115-1.

The washing machine 100 may rotate the pulsator 115 according to a predetermined mode (e.g., a dehydration process). A specific shape corresponding to the predetermined pattern may be generated on the operating pulsator 115-2. Herein, the specific shape may be a shape formed by the predetermined pattern by the rotation of the pulsator 115.

The washing machine 100 may capture the operating pulsator 115-2 and confirm whether the water collection has occurred based on whether an object 52 is detected from the captured image. Herein, a shape of the object 52 to be formed may vary depending on the predetermined pattern (e.g., a fan-shaped pattern 51), the vibration intensity, and the rotation speed. Specifically, shadow, chroma, or color of the object 52 included in the captured image may vary depending on the shape of the predetermined pattern. In addition, in a case where the pulsator 115 rotates at a high speed, a circular shape formed by the fan-shaped pattern 51 may be clearly formed. Alternatively, if the vibration intensity is high during the operation of the washing machine 100, the circular shape formed by the fan-shaped pattern 51 may be formed to be close to an ellipse or distorted.

Figure 6:
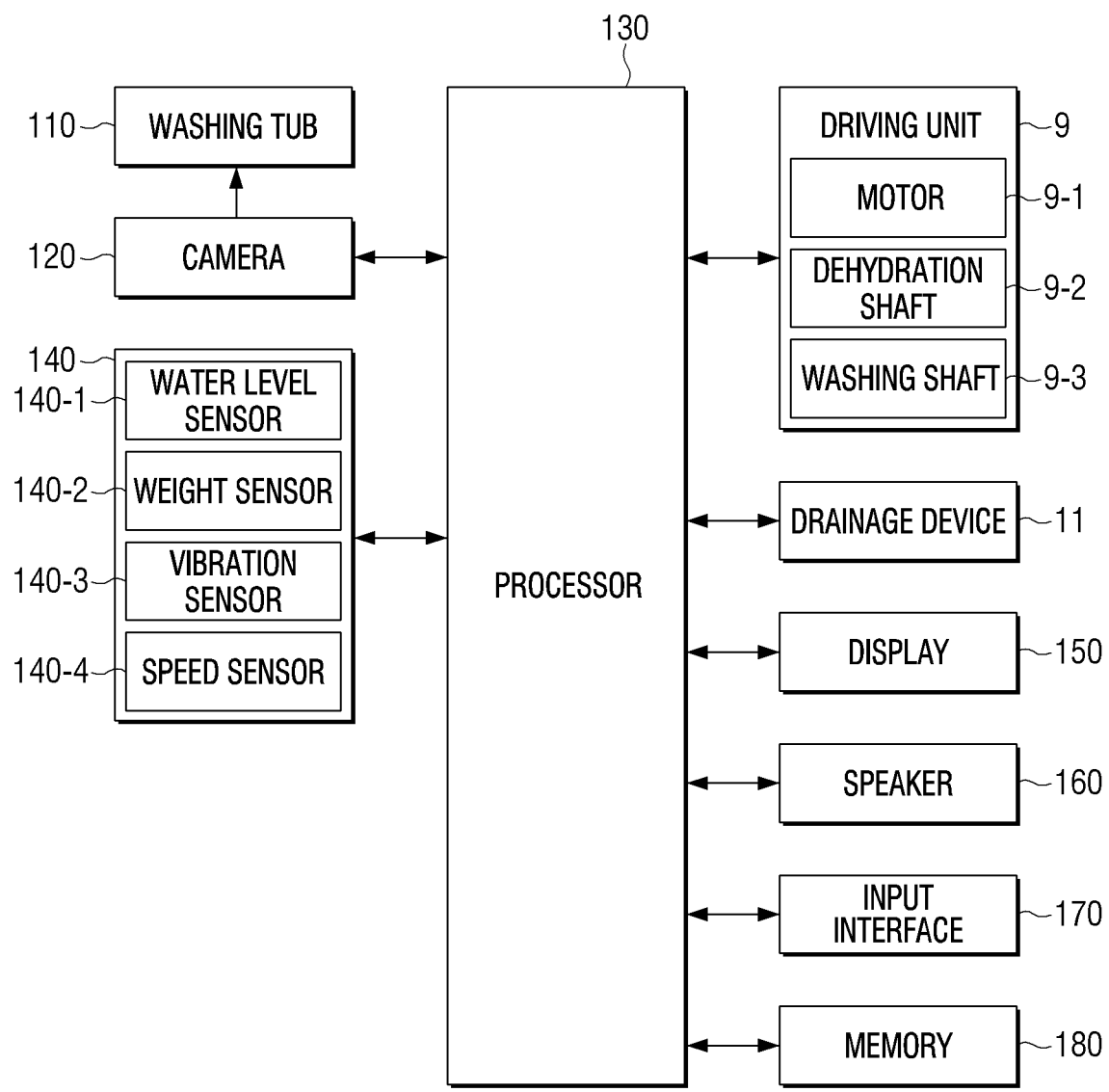
FIG. 6 is a block diagram specifically illustrating a configuration of a washing machine according to an embodiment of the disclosure.

FIG. 6 is a block diagram specifically illustrating a configuration of a washing machine according to an embodiment of the disclosure.

Referring to FIG. 6, the washing machine 100 may include the washing tub 110, the camera 120, the processor 130, a sensor 140, the driving unit 9, the drainage device 11, a display 150, a speaker 160, an input interface 170, and a memory 180. Meanwhile, the washing tub 110, the camera 120, and the processor 130 illustrated in FIG. 6 have been described with reference to FIG. 2, and therefore the overlapped description will not be repeated.

The sensor 140 may include a water level sensor 140-1, a weight sensor 140-2, a vibration sensor 140-3, and a speed sensor 140-4. Each of the sensors included in the sensor 140 may be implemented as a physically separate device or the sensors may also be implemented as one device. In other words, in the implementation, the sensor 140 is not limited to be implemented as one physical device.

The sensor 140 may detect a state or a surrounding environment of the washing machine 100 and generate and output an electric signal regarding the detected result. The sensor 140 may transmit the electric signal to the processor 130 and store the detected result to the memory 180 of the washing machine 100 or an external device.

The sensor 140 may detect the state of the washing machine 100 while operating a predetermined process of the washing machine 100 and confirm an abnormal state of the washing machine 100.

Specifically, the water level sensor 140-1 may detect a water level or a flow rate of the wash water. In this case, the processor 130 may store the water level or the flow rate of the wash water detected by the water level sensor 140-1 in the memory 180. Specifically, while the wash water is supplied into the washing tub 110 or wash water is discharged from the inside of the washing tub 110, the water level sensor 140-1 may detect the water level or the flow rate of the wash water. For this, the water level sensor 140-1 may be implemented as a mechanical water level detecting sensor, a pressure-sensitive sensor, a sensor using a semiconductor or capacitance, or the like. Accordingly, the water level sensor 140-1 may detect a flow rate of the wash water supplied to the washing tub 110 or a flow rate of the wash water discharged from the washing tub 110.

In addition, the data detected by the water level sensor 140-1 may be used by the processor 130 to determine whether the water collection has occurred. Specifically, the amount of wash water existing in the washing machine 100 when the dehydration process has finished may be expected by comparing a history of the flow rate of the wash water supplied to the washing tub 110 or the flow rate of the wash water discharged from the washing tub 110. In other words, the processor 130 may identify whether the water collection has occurred without discharging a large amount of wash water, by further using the water level sensor 140-1.

The weight sensor 140-2 may detect a weight of the washing tub 110. In this case, the processor 130 may store data regarding the weight of the washing tub 110 detected by the weight sensor 140-2 in the memory 180. When the laundry exists in the washing tub 110, the weight sensor 140-2 may detect the weight of the laundry and the washing tub 110 and predict a difference between the detected weight and the pre-stored weight of the washing tub 110 as a weight of the laundry.

The data detected by the weight sensor 140-2 may be used by the processor 130 to determine whether the water collection has occurred. Specifically, the weight sensor 140-2 may detect the weight of the wash water and the laundry accommodated in the washing tub 110 and expect the amount of wash water existing in the washing machine 100 when the dehydration process has ended. In addition, the processor 130 may identify whether the water collection phenomenon has occurred without discharging a large amount of wash water, by further using the weight sensor 140-2.

The vibration sensor 120-3 may detect a degree of vibration of the washing machine 100. Specifically, the vibration sensor 120-3 may detect a degree of vibration of the washing machine 100 by the rotation operation of the washing tub 110 or the pulsator 115, while the washing tub 110 or the pulsator 115 vibrates in the washing and dehydration process and the like. When the laundry accommodated in the washing tub 110 is abnormal (e.g., water collection), the rotation shaft of the washing tub may be beyond the predetermined range and a higher degree of vibration may be detected, compared to the operation in the normal state. The vibration sensor 120-3 may be implemented as a micro-electromechanical system (MEMS).

The speed sensor 140-4 may detect a rotation speed (ω), a rotation angle (θ), a rotation direction, and the like of the motor 9-1, the pulsator 115, or the washing tub 110. In this case, the processor 130 may use the rotation speed (ω), the rotation angle (θ), and the rotation direction of the motor 9-1, the pulsator 115, or the washing tub 110 detected by the speed sensor 140-4 as data for determining the abnormal situation of the washing machine 100. In addition, the processor 130 may store the data detected by the speed sensor 140-4 in the memory 180. For this, the speed sensor 140-4 may be implemented as a sensor using a method for detecting a load magnitude applied to the motor 9-1, when the motor 9-1 rotates the washing tub 110 or the pulsator 115, a method for detecting an on/off signal of a hall sensor adjacent to the position of the dehydration shaft 9-2 or the washing shaft 9-3 while the motor 9-1 rotates the dehydration shaft 9-2 or the washing shaft 9-3. However, this is merely an embodiment and the sensor is not limited thereto and may be implemented as various types of sensors.

The data detected by the sensor 140 may be used as data for grasping the abnormal state of the washing machine 100, and particularly, detecting the water collection. The processor 130 may grasp whether the predetermined operation (particularly, dehydration process) of the washing machine 100 is abnormal based on the data detected by the sensor 140. In addition, according to an embodiment of the disclosure, the washing machine 100 may include the camera 120 and the sensor 140 together to grasp the abnormality occurred in the washing machine 100 or the washing machine 100 may include only the camera 120 or the sensor 140.

The display 150 may display a specific image or operation information regarding the washing machine 100. Herein, in a case where the washing machine 100 is being operated in a specific process, the operation information may include remaining time, operated time of the specific process, a washing course, information regarding the operation start and end, and the like. In addition, the display 150 may receive data from the camera 120 which captures the inside of the washing tub 110 and display the captured image in real time. The display 150 may be mounted on one side of the main body 1 of the washing machine 100 or may be implemented as a separate device outside of the washing machine 100.

The speaker 160 may output the operation information of the washing machine 100 as a voice. Herein, the operation information may include on/off information of power and information regarding start and end of the operation. Specifically, the speaker 160 may output an end of a specific process as a voice, when the specific process of the washing machine 100 ends. In addition, when the abnormal state of the washing machine 100 is detected, the abnormality of the washing machine 100 may be notified to a user as an output of an alert.

The input interface 170 may receive an operation command for the washing machine 100. Herein, the operation command may include commands regarding a washing process, a dehydration process, a washing course according to a material, and start and end of the operation. The input interface 170 may include a touch panel and the touch panel may be formed as a touch screen provided integrally with a display panel. The input interface 170 may be disposed at one side of the main body 1.

The memory 180 may store various instructions, programs, or data necessary for the operation of the washing machine 100 or the processor 130. For example, the memory 180 may store the information obtained by the sensor 140 and may store an image captured by the camera 120 in real time. In addition, the memory 180 may store the number of vibrations during the operation of the washing machine 100 in a normal state, information regarding the rotation shaft of the washing tub 110, the predetermined pattern formed on the bottom surface of the washing tub 110, and the object corresponding to the predetermined pattern, an algorithm for detecting the object, and the like. Meanwhile, the memory 180 may be implemented as a volatile memory and a non-volatile memory. The memory 180 may be accessed by the processor 130 and reading, recording, editing, deleting, or updating of the data by the processor 130 may be executed. A term, memory, in the disclosure may include the memory 180, a read only memory (ROM) (not illustrated) and random access memory (RAM) (not illustrated) in the processor 130, or a memory card (not illustrated) (e.g., micro secure digital (SD) card or memory stick) mounted on the washing machine 100.

Figure 7:
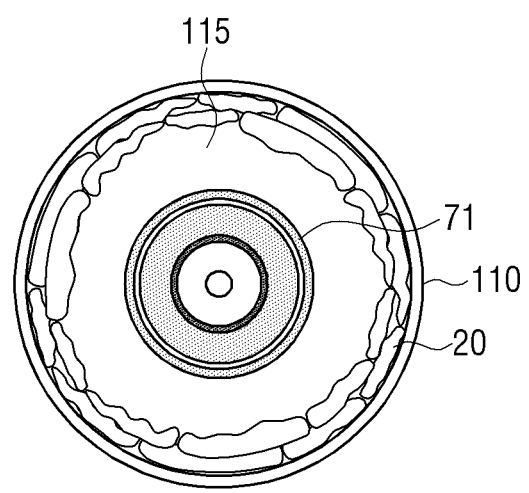
FIG. 7 is a diagram illustrating an image obtained by capturing a washing machine by a camera according to an embodiment of the disclosure.
Figure 8:
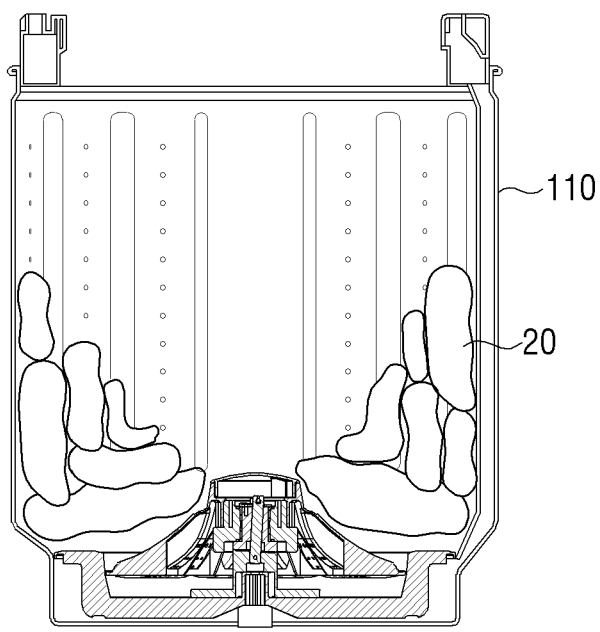
FIG. 8 is a diagram illustrating a normal operation of a washing machine according to an embodiment of the disclosure.

FIGS. 7 and 8 are diagrams illustrating an image obtained by capturing a washing machine by using a camera according to various embodiments of the disclosure.

Referring to FIG. 7, it illustrates an image captured by the camera 120 disposed in a direction towards the inside of the washing tub 110 during the rotation of at least one of the washing tub 110 and the pulsator 115. When the washing machine 100 is operated according to the predetermined mode (e.g., a dehydration process), at least one of the washing tub 110 and the pulsator 115 may rotate according to the predetermine mode, and a rotation water flow for a laundry 20 may be generated according to the rotation of the washing tub 110 and the pulsator 115, referring to FIG. 8. The generated rotation water flow may rotate the laundry 20 and a centrifugal force may be generated in the rotating laundry 20. The laundry 20 may be positioned to be close to an edge or a side surface of the washing tub 110 due to the generated centrifugal force. Since the laundry 20 is disposed to be close to the side surface of the washing tub 110, the predetermined pattern formed on the bottom surface of the washing tub 110 may be exposed without being covered by the laundry 20.

In addition, the camera 120 may capture the center area of the bottom surface of the washing tub during the rotation of at least one of the washing tub 110 and the pulsator 115. The predetermined pattern on the center area of the washing tub 110 and the pulsator 115 may form a specific shape according to the rotation of the washing tub 110 and the pulsator 115. The formed specific shape may be detected as an object corresponding to the predetermined pattern in the image captured by the camera 120. The washing machine 100 may confirm whether the water collection has occurred based on whether the object is detected form the captured image.

Figure 9:
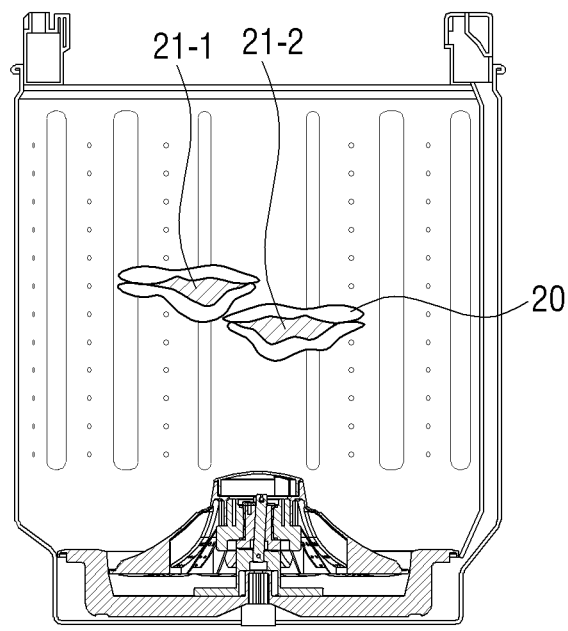
FIG. 9 is a diagram illustrating water collection according to an embodiment of the disclosure.
Figure 9:
Figure 9:
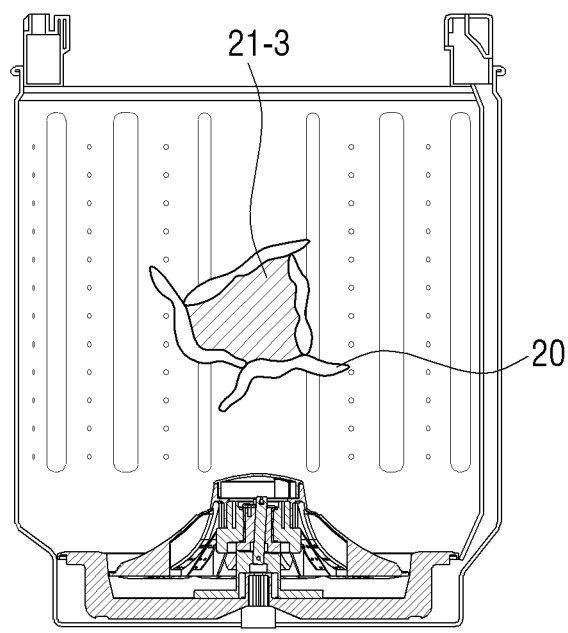

FIG. 9 is a diagram illustrating water collection according to an embodiment of the disclosure.

Referring to FIG. 9, it illustrates the laundries 20 and wash water 21-1 and 21-2 between the laundries 20. The wash water 21-1 and 21-2 may be not discharged to the outside of the washing tub 110 from between the laundry 20 depending on the material or shape of the laundry and may exist between the laundries 20. Herein, the material of the laundry 20 may be waterproof cloth or a waterproofed special material so that the wash water 21-1 and 21-2 may not penetrate. In addition, the shape of the laundry 20 may be that the laundry is twisted due to the rotation water flow generated due to the rotation of the washing tub 110 or the pulsator 115.

Even in a case where the washing machine 100 is operated in the predetermined mode (e.g., a dehydration process), the wash water 21-1 and 21-2 may still exist between the laundry 20 and the existing wash water 21-1 and 21-2 may be combined so that a large amount of wash water 21-3 exists at the center of the washing tub 110. Herein, the large amount of the wash water may refer to a water collection phenomenon due to the laundry or water collection of the laundry.

Figure 10:
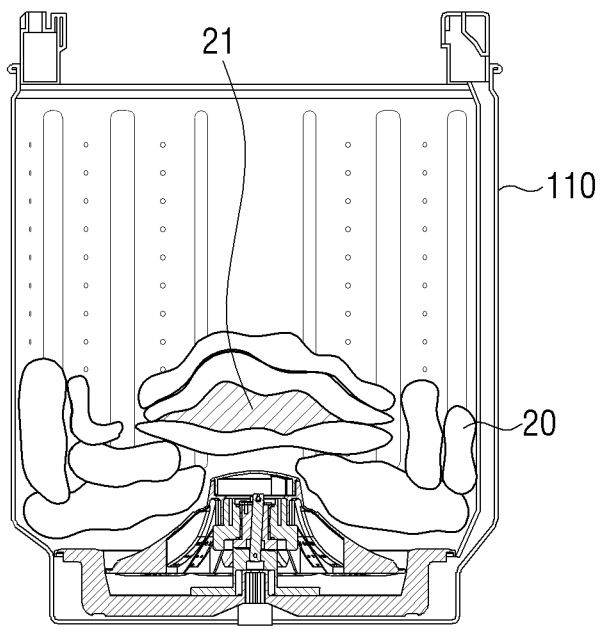
FIG. 10 is a diagram illustrating a case where water collection has occurred according to an embodiment of the disclosure.

FIG. 10 is a diagram illustrating a case where water collection has occurred according to an embodiment of the disclosure.

Referring to FIG. 10, it illustrates the laundry 20 and the wash water 21 existing in the washing tub 110.

When the washing machine 100 is operated in the predetermined mode (e.g., a dehydration process), the rotation water flow may be generated according to the rotation of the washing tub 110 or the pulsator 115 and the laundry 20 may rotate according to the generated rotation water flow. In general, the wash water 21 should be discharged from the laundry 20 due to the centrifugal force generated on the rotating laundry 20, however, the wash water 21 may exist between the laundry 20 without being discharged to the outside of the washing tub 110 from the laundry 20 depending on the material or the shape of the laundry 20. In this case, the wash water 21 may be positioned at the center of the washing tub 110 and the wash water 21 and the laundry 20 surrounding the wash water 21 may cover the predetermined pattern formed on the bottom surface of the washing tub 110. In addition, the washing machine 100 may confirm whether the water collection has occurred based on whether the object corresponding to the predetermined pattern is detected from the image captured by the camera 120.

Specifically, when the water collection of the laundry 20 has occurred, the predetermined pattern formed on the bottom surface may be covered, and the object corresponding to the predetermined pattern may not be detected from the image captured by the camera 120 during the rotation of the washing tub 110 or the pulsator 115. When the object is not detected, the washing machine 100 may confirm that the water collection has occurred.

Figure 11:
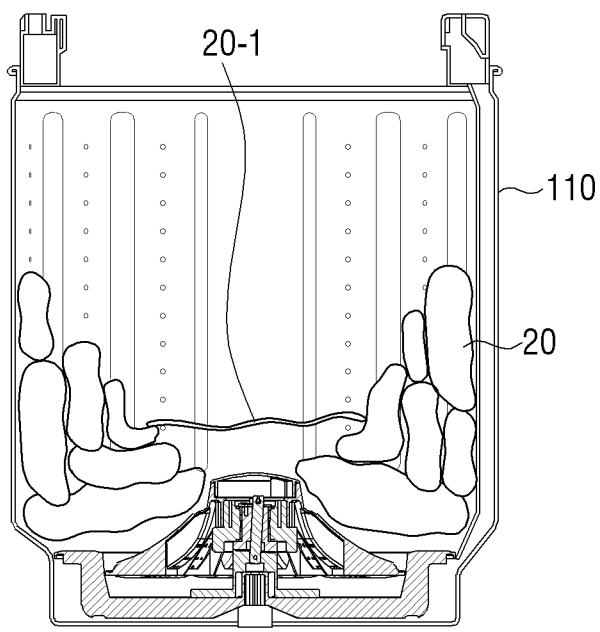
FIG. 11 is a diagram illustrating a case where water collection has not occurred according to an embodiment of the disclosure.

FIG. 11 is a diagram illustrating a case where water collection has not occurred according to an embodiment of the disclosure.

Referring to FIG. 11, it illustrates the inside of the washing tub 110 in a normal state where the problem, such as the water collection has not occurred. As described above with reference to FIGS. 7 and 10, the laundry 20 may rotate according to the generated rotation water flow and the laundry 20 may be positioned close to the edge or the side surface of the washing tub 110 due to the centrifugal force. However, some laundry 20-1 from the laundry 20 may not be positioned close to the edge or the side surface of the washing tub 110.

Specifically, regarding the laundry 20, the some laundry 20-1 may be overlapped between the other laundry 20 during the process of rotation by the generated rotation water flow. Referring to FIG. 11, the some laundry 20-1 may cover a part of the predetermined pattern formed on the bottom surface of the washing tub 110 or may cover a part of the object in the captured image.

The washing machine 100 may determine whether the water collection has occurred by using an additional sensor (not illustrated) or an additional device (not illustrated), in addition to the camera 120. Specifically, the washing machine 100 may identify the laundry 20 or the wash water existing at the center of the washing tub 110 by further using the additional sensor (not illustrated) or the additional device (not illustrated). Herein, the additional sensor (not illustrated) or the additional device (not illustrated) may refer to a sensor or a device which detects presence of an object without physical contact and may be, for example, an ultrasonic device (not illustrated), an infrared device (not illustrated), a proximate sensor (not illustrated), or the like.

When the washing machine 100 did not detect the object in the image captured by the camera 120, but determined that the some laundry 20-1 covers the object based on the information detected by the additional sensor (not illustrated) or the additional device (not illustrated), the washing machine 100 may determine that the water collection has not occurred.

Figure 12:
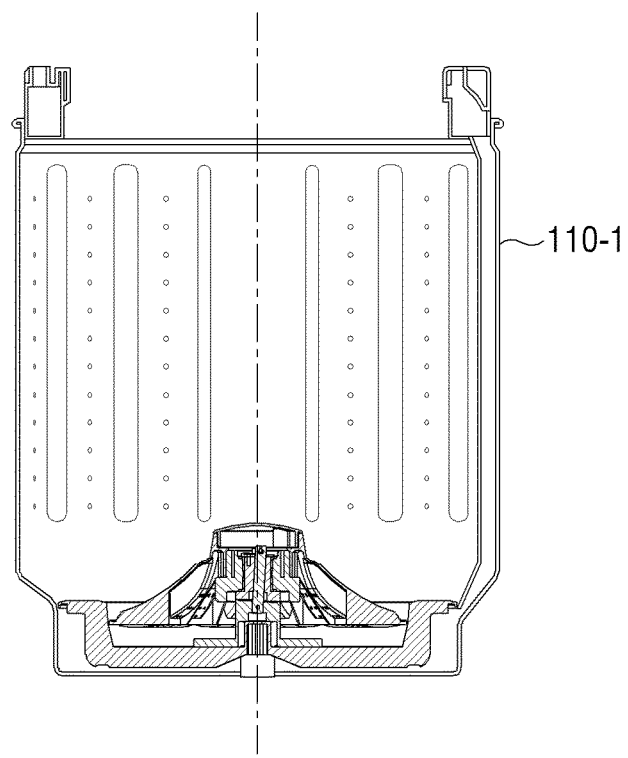
FIG. 12 is a diagram illustrating abnormality of a washing machine according to an embodiment of the disclosure.
Figure 12:
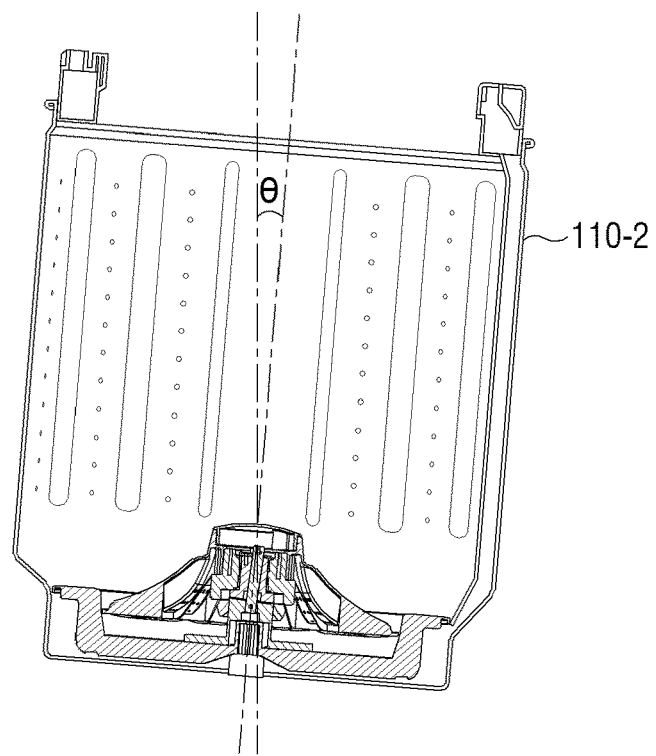

FIG. 12 is a diagram illustrating abnormality of a washing machine according to an embodiment of the disclosure.

Referring to FIG. 12, it illustrates a first washing tub 110-1 not in the abnormal situation in the washing machine 100 and a second washing tub 110-2 in the abnormal situation. Specifically, regarding the first washing tub 110-1, it is assumed that the washing machine 100 is not operated or the washing machine 100 is being operated normally. For the second washing tub 110-2, it is assumed that the rotation shaft of the washing tub is beyond a predetermined range. Herein, the rotation shaft may refer to a perpendicular line with respect to a diameter of the bottom surface of the washing tub 110. In other words, the rotation shaft may refer to a virtual line vertical to the bottom surface of the washing tub based on the center of the washing tub 110. The predetermined range of the rotation shaft may refer to an angle by which the rotation shaft of the washing tub 110 is deviated based on the rotation shaft of the first washing tub 110-1.

The washing machine 100 may confirm the rotation shaft of the washing tub 110 using the image captured by the camera 120 and confirm the abnormal situation of the washing machine 100, when the confirmed rotation shaft is beyond the predetermined range. For example, during the normal driving of the washing machine 100, the rotation shaft of the washing tub 110 may move within the predetermined range of −5 degrees to 5 degrees. Meanwhile, when the abnormal situation, such as the water collection in the washing machine 100 or the insertion of foreign materials to one surface including the bottom surface of the washing tub 110 occurs, the rotation shaft of the second washing tub 110-2 may move beyond the predetermined range. In this case, the washing machine 100 may identify the abnormal situation of the washing machine 100.

Figure 13:
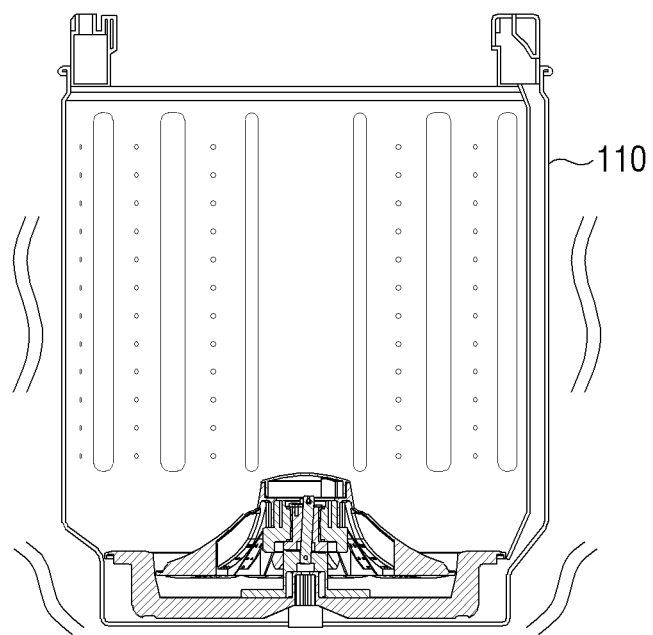
FIG. 13 is a diagram illustrating abnormality of a washing machine according to an embodiment of the disclosure.

FIG. 13 is a diagram illustrating abnormality of a washing machine according to an embodiment of the disclosure.

Referring to FIG. 13, the washing machine 100 may detect a degree of vibration of the washing machine 100 by using the sensor included in the washing machine 100 and detect the abnormal situation of the washing machine 100, when the vibrating degree is beyond a predetermined range. For example, the degree of the vibration of the washing tub 110 may be a value of a predetermined range, during the operation in the predetermined mode (e.g., a dehydration process) in the normal situation of the washing machine 100. Herein, the value of the predetermined range may vary depending on a weight of the laundry or the wash water accommodated in the washing machine 100, a rotation speed of the washing tub 110, and the like, and the predetermined range may be determined as a suitable range experimentally.

Meanwhile, when the abnormal situation, such as the water collection in the washing machine 100 or the insertion of foreign materials to one surface including the bottom surface of the washing tub 110 occurs, the degree of vibration of the washing tub 110 may move beyond the predetermined range. In this case, the washing machine 100 may identify the abnormal situation of the washing machine 100.

Figure 14:
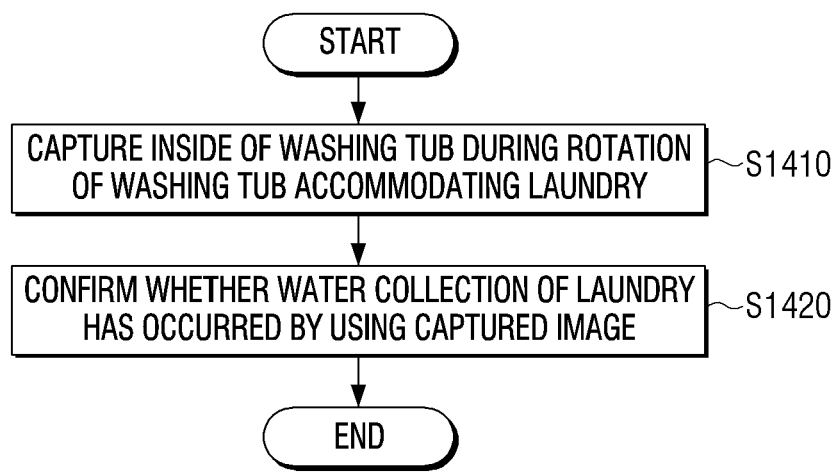
FIG. 14 is a diagram illustrating a flowchart of a washing machine according to an embodiment of the disclosure.

FIG. 14 is a diagram illustrating a flowchart of a washing machine according to an embodiment of the disclosure.

Referring to FIG. 14, the washing machine 100 may accommodate the laundry in the washing tub 110 and operate according to the predetermined mode. Specifically, the washing machine 100 may wash the laundry by loading the wash water according to the washing process, and the washing machine 100, after the washing process, may perform the dehydration process of discharging the wash water by rotating at least one of the washing tub 110 or the pulsator 115. In addition, the washing machine 100 may detect occurrence of the abnormal situation occurred during the dehydration process.

Specifically, the washing machine 100 may capture the inside of the washing tub 110 during the rotation of the washing tub 110 accommodating the laundry at operation S1410. Herein, the pulsator 115 may be formed on the bottom surface of the washing tub 110 and the predetermined pattern may be formed in the center area of the bottom surface of the washing tub 110 or the pulsator 115. Herein, the predetermined pattern may include at least one of a lattice pattern, a streak pattern, or a fan pattern.

The washing machine 100 may confirm whether the water collection of the laundry has occurred by using the captured image at operation S1420. Specifically, the predetermined pattern formed in the center area of the bottom surface of the washing tub 110 or the pulsator 115 may form a specific shape corresponding to the predetermined pattern according to the rotation of the washing tub 110 or the pulsator 115. In addition, the washing machine 100 may identify the object corresponding to the predetermined pattern or the specific shape from the captured image. When the object is detected, the washing machine 100 may confirm that there is no water collection, and when the object is not detected, the washing machine may confirm that the water collection has occurred.

When the water collection is confirmed, the washing machine 100 may control a rotation speed so that the washing tub 110 or the pulsator 115 rotates at a speed equal to or lower than a predetermined speed.

In addition, the washing machine 100 may confirm a rotation shaft of the washing tub 110 using the captured image and confirm the abnormal situation, if the confirmed rotation shaft is beyond a predetermined range.

Figure 15:
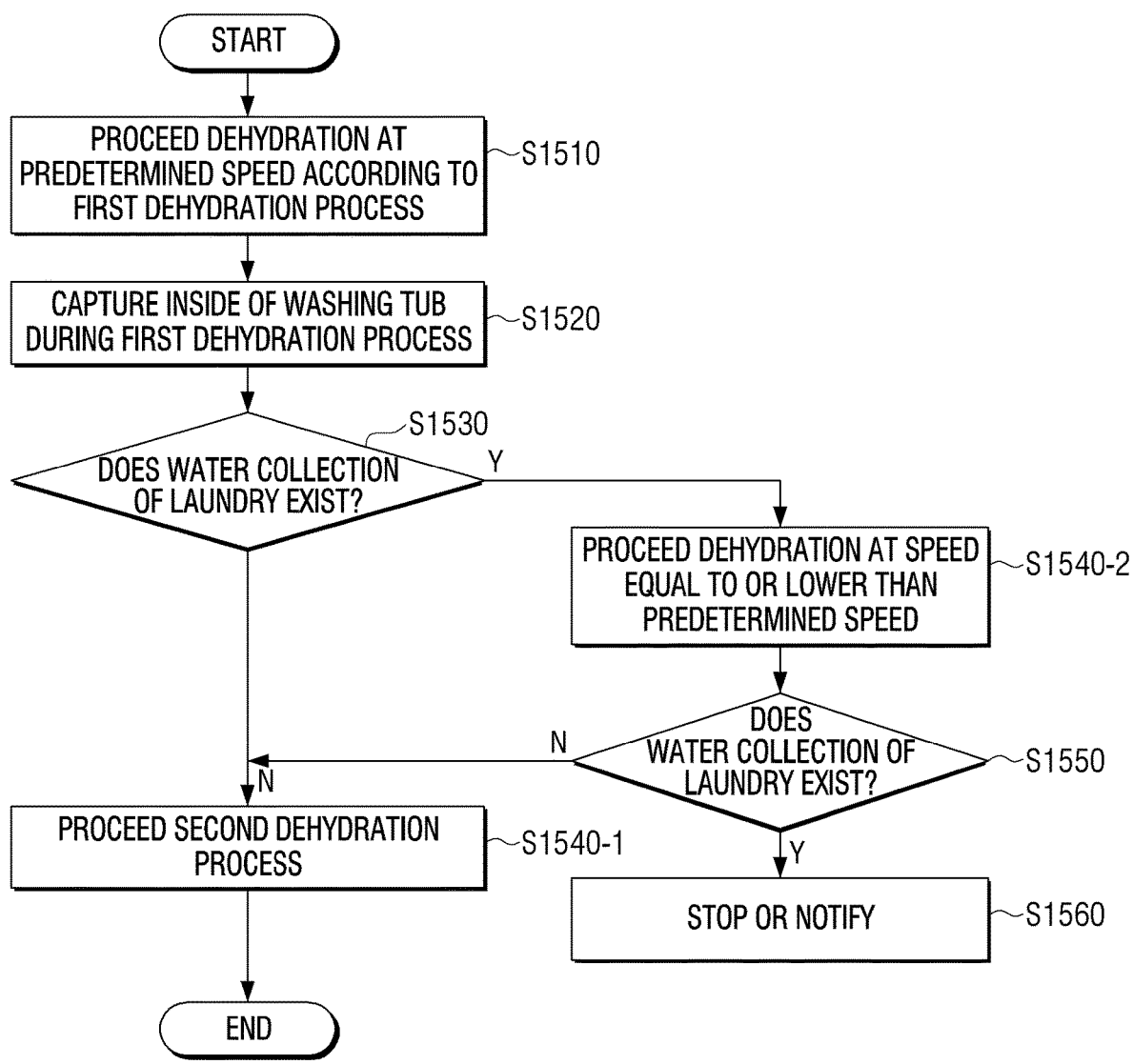
FIG. 15 is a diagram illustrating a flowchart of a washing machine according to an embodiment of the disclosure.

FIG. 15 is a diagram illustrating a flowchart of a washing machine according to another embodiment of the disclosure.

The washing machine 100 may proceed preliminary dehydration by adjusting the rotation speed of the washing tub 110 or the pulsator 115 and adjust the rotation speed, when the abnormal situation, such as the water collection is confirmed.

Referring to FIG. 15, firstly, the washing machine 100 may proceed the dehydration at a predetermined speed according to a first dehydration process at operation S1510. Herein, the first dehydration process may be a preliminary process for determining whether the water collection has occurred, and the predetermined speed may refer to a rotation speed of the washing tub 110 or the pulsator 115.

In addition, the washing machine 100 may capture the inside of the washing tub 110 during the first dehydration process at operation S1520 and determine whether the water collection of the laundry exists at operation S1530. The washing machine 100 may determine whether the water collection of the laundry exists based on whether the object is detected from the captured image or the data obtained from the sensor included in the washing machine 100.

When it is determined that the water collection of the laundry does not exist at operation S1530-N, a second dehydration process may be proceeded at operation S1540-1. Herein, the second dehydration process may be a high-speed dehydration process of operating at a speed higher than the predetermined speed of the first dehydration process.

On the other hand, when it is determined that the water collection of the laundry exists at operation S1530-Y, the washing machine 100 may proceed the dehydration at a speed equal to or lower than the predetermined speed at operation S1540-2. When the dehydration process proceeds at the predetermined speed or a speed equal to or higher than the predetermined speed, while the water collection has occurred, a pressure of the wash water may increase and the increased pressure of the wash water may cause physical damage on the washing machine 100 or a user. Accordingly, the washing machine 100 may prevent such a problem by controlling the rotation speed of the washing tub 110 or the pulsator 115.

The washing machine 100 may proceed the dehydration at a speed equal to or lower than the predetermined speed and may confirm again whether the water collection of the laundry still exists at operation S1550. When it is confirmed that the water collection does not exist, the washing machine 100 may proceed the dehydration with the second dehydration process at operation S1550-N.

On the other hand, when it is determined that the water collection of the laundry still exists at operation S1550-Y, the washing machine 100 may stop the dehydration process or the washing machine 100 may notify a user that the abnormality has occurred in the dehydration process or in the washing machine 100 at operation S1560.

Meanwhile, although not illustrated in FIG. 15, the washing machine 100 may also determine whether the water collection of the laundry exists during the second dehydration process, and may adjust the rotation speed of the washing tub 110 or the pulsator 115 according to the water collection. Accordingly, when it is determined that the water collection of the laundry exists during the second dehydration process, the washing machine 100 may stop the second dehydration process or change the rotation speed of the washing tub 110 or the pulsator 115 to a low speed.

The control method of the washing machine 100 described above may be implemented for the washing machine 100 having the configuration of FIG. 1, FIG. 2, or FIG. 6 and may also be implemented for the washing machine 100 having other configurations.

The control method of the washing machine 100 according to the embodiment described above may be implemented as a program to be provided to the washing machine 100. In particular, the program including the control method of the washing machine 100 may be stored and provided in a non-transitory computer-readable medium. Herein, the non-transitory computer-readable medium is not a medium storing data for a short period of time, such as a register, a cache, or a memory, but may refer to a medium that semi-permanently stores data and is readable by a machine. Specific examples of the non-transitory computer-readable medium may include a compact disk (CD), a digital versatile disc (DVD), a hard disk drive, a Blu-ray disc, a universal serial bus (USB), a memory card, and a ROM.

The methods according to the embodiments of the disclosure described above may be implemented in a form of an application installable on the washing machine 100 of the related art.

In addition, the methods according to the embodiments of the disclosure described above may be implemented simply by the software upgrade or hardware upgrade in the washing machine 100 of the related art.

Further, the embodiments of the disclosure described above may be performed through an embedded server provided in the washing machine 100 or an external server of the washing machine 100.

The embodiments described above may be implemented in a recording medium readable by a computer or a similar device using software, hardware, or a combination thereof According to the implementation in terms of hardware, the embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions. In some cases, the embodiments described in the specification may be implemented as the processor 130 itself According to the implementation in terms of software, the embodiments, such as procedures and functions described in this specification may be implemented as separate software modules. Each of the software modules may perform one or more functions and operations described in this specification.

While the disclosure has been shown and described with reference to various embodiments thereof, it will be understood by those skilled in the in the art that various changes in form and details may be made therein without departing from the spirit and scope of the disclosure as defined by the appended claims and their equivalents.

What is claimed is:

1. A washing machine comprising:
    a washing tub formed with a predetermined pattern on a bottom surface below a pulsator with the predetermined pattern disposed in a center area thereof, the washing tub configured to accommodate a laundry;
    a camera configured to be disposed in a direction towards an inside of the washing tub; and
    a processor configured to:
        capture an image of a center of the bottom surface of the washing tub and the pulsator by the camera during rotation of the washing tub, and
        confirm whether water collection exists based on whether a shape of an object corresponding to the predetermined pattern, a vibration intensity and a rotation speed is detected in the image captured by the camera during the rotation of the washing tub and the pulsator,
        based on the shape of an object corresponding to the predetermined pattern, the vibration intensity and a rotation speed pattern being detected, confirm that the water collection does not exist,
        based on the shape of an object corresponding to the predetermined pattern, the vibration intensity and the rotation speed pattern being not detected, confirm that the water collection exists, and
        based on the water collection being confirmed, control the rotation speed so that the washing tub rotates at a speed equal to or lower than a predetermined speed.

2. The washing machine of claim 1, wherein the predetermined pattern is formed in a shape including at least one of a lattice pattern, a streak pattern, or a fan-shaped pattern.

3. The washing machine of claim 1, wherein the washing tub is formed with the pulsator on the bottom surface.

4. The washing machine of claim 1, wherein the processor is further configured to confirm whether the water collection exists by using the image captured by the camera during a dehydration process of the laundry.

5. The washing machine of claim 1, wherein the camera is disposed in one area of a door or one area adjacent to a water supply pipe.

6. The washing machine of claim 1, wherein the processor is further configured to:
    confirm a rotation shaft of the washing tub is beyond a predetermined range by using the image captured by the camera, and
    based on the confirmed rotation shaft being beyond the predetermined range, confirm an abnormal situation.

7. The washing machine of claim 6, wherein the processor is further configured to:
    confirm again whether the water collection exists, and
    based on the water collection being confirmed again, stop the rotation.

* * * * *